June 5, 1923.　　　　　　　　　　　　　　　　1,457,804
A. WIGAND
CONTACT BOWL
Filed June 3, 1922

Inventor:
Albert Wigand

Patented June 5, 1923.

1,457,804

UNITED STATES PATENT OFFICE.

ALBERT WIGAND, OF HALLE, GERMANY, ASSIGNOR TO THE FIRM OF CARL ZEISS, OF HALLE, GERMANY.

CONTACT BOWL.

Application filed June 3, 1922. Serial No. 565,781.

*To all whom it may concern:*

Be it known that I, ALBERT WIGAND, a citizen of the German Empire, residing at Halle, Germany, have invented a new and useful Contact Bowl (for which I have filed an application in Germany December 13, 1918), of which the following is a specification.

The present invention relates to a contact bowl, i. e. to a small spectacle glass which is destined to be placed directly upon the eyeball so as to sufficiently stick to the same in order to move along with the eye in viewing. By making such contact bowls, as has hitherto taken place, of thin glass without working them later on, it is generally impossible to attain such a finish of the outer surface as is desirable. To improve the finish of the outer surface by grinding is both difficult and expensive; moreover ground glass is not sufficiently resistive to the chemical action of the (alkaline) lachrymal fluid. Besides such a glass bowl is always easily liable to be smashed.

According to the invention a transparent, organic substance, which is resistive to the lachrymal fluid as, e. g. cellon or celluloid, is softened by heating, having thereupon imparted to it by moulding or pressing the shape of a bowl having the size of the front surface of the eyeball and of about 1 mm thickness, and ultimately its front surface is brought to its suitably thickened middle part by means of grinding or polishing to the shape corresponding to the desired lens action. The front surface can also be particularly protected by a transparent lacquer coating.

Owing to the possibility of working the front surface of the new contact bowl, an optional form within wide limits may be imparted to this surface. Hence a large number of such bowls of uniform type can be manufactured for stock and then, by finishing the front surface, it is possible to attain in each separate bowl that refractive effect which is requisite for removing the existing defect of the eye (keratoconus, astigmatism of the cornea, myopia, hypermetropia, aphacia).

The new contact bowl possesses a certain amount of flexibility and clings to the eyeball; it therefore sticks well without injuring. Being almost infrangible, it serves directly as sight-preserving spectacles. On account of the comparatively high refractive index of the respective substances the curvatures of the middle part acting as a lens become comparatively small; the middle part may therefore become comparatively thin.

Figure 1:
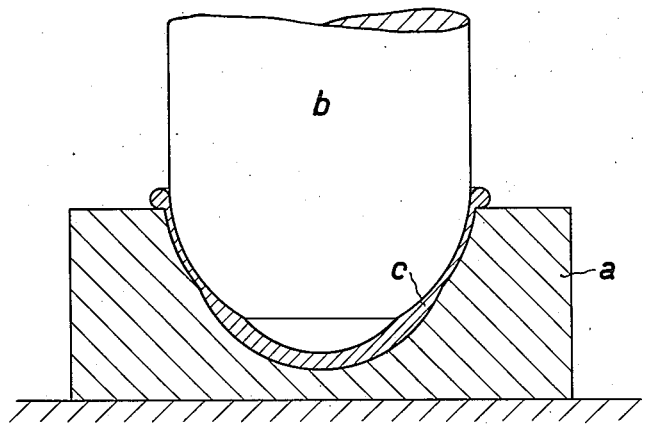
Figure 2:
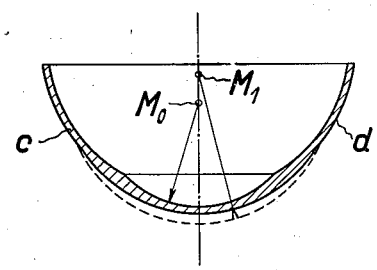

Fig. 1 of the annexed drawings shows in a section on an enlarged scale an example for manufacturing for stock the bowls which are to be finished later on according to the particular requirements; Fig. 2 shows in a section on the same scale an example for manufacturing a dispersive, Fig. 3 an example for manufacturing a collective bowl.

In Fig. 1 $a$ denotes a press-form and $b$ a press-stamp. A layer $c$ of cellon softened by heating is brought into the mould and then pressed against the latter so as to receive the form shown in Fig. 1.

Fig. 2 shows a dispersive glass which is made of the glass shown in Fig. 1 by working the middle part according to a spherical surface, the centre $M_1$ of which is at a greater distance from the inner vertex of the bowl than the centre $M_0$ of the inner surface. The original form is shown by dotted lines, the projecting margin has been cut off. On its outside the bowl is provided with a lacquer coating $d$.

Figure 3:
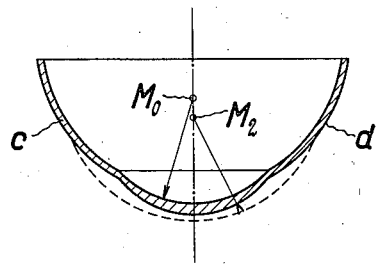

Fig. 3 shows a collective bowl in which the centre $M_2$ of the outer surface is nearer the vertex than the centre $M_0$ of the inner surface.

In the appended claim celluloid as well as cellon are included for the above contact bowls.

I claim:

Contact bowl consisting of cellon and being coated on its front surface with a transparent lacquer.

ALBERT WIGAND.

Witnesses:
PAUL KRÜGER,
FRITZ LANDER.